United States Patent
Nos et al.

(10) Patent No.: US 10,530,792 B2
(45) Date of Patent: Jan. 7, 2020

(54) USING FREQUENCY ANALYSIS IN ENTERPRISE THREAT DETECTION TO DETECT INTRUSIONS IN A COMPUTER SYSTEM

(71) Applicant: SAP SE, Walldorf (DE)

(72) Inventors: Kathrin Nos, Nussloch (DE); Volker Guzman, Heidelberg (DE); Marvin Klose, Mannheim (DE)

(73) Assignee: SAP SE, Walldorf (DE)

( * ) Notice: Subject to any disclaimer, the term of this patent is extended or adjusted under 35 U.S.C. 154(b) by 32 days.

(21) Appl. No.: 15/380,450

(22) Filed: Dec. 15, 2016

(65) Prior Publication Data

US 2018/0176238 A1 Jun. 21, 2018

(51) Int. Cl.
*H04L 29/06* (2006.01)

(52) U.S. Cl.
CPC .......... *H04L 63/1425* (2013.01); *H04L 63/02* (2013.01); *H04L 63/14* (2013.01)

(58) Field of Classification Search
CPC . H04L 63/1425; H04L 63/14; H04L 63/1408; H04L 63/125; H04L 43/00; H04L 43/062; H04L 43/067
See application file for complete search history.

(56) References Cited

U.S. PATENT DOCUMENTS

| | | | |
|---|---|---|---|
| 5,440,726 A | 8/1995 | Fuchs | |
| 5,960,170 A | 9/1999 | Chen | |
| 6,173,418 B1 | 1/2001 | Fujino et al. | |
| 6,629,106 B1 | 9/2003 | Narayanaswamy | |
| 6,779,001 B1 | 8/2004 | Kanai et al. | |
| 7,376,969 B1 | 5/2008 | Njemanze | |
| 7,380,205 B2 | 5/2008 | Bezrukov et al. | |
| 7,441,197 B2 | 10/2008 | Tschiegg et al. | |
| 7,457,792 B2 | 11/2008 | Weigt et al. | |
| 7,457,793 B2 | 11/2008 | Weigt et al. | |
| 7,457,794 B2 | 11/2008 | Weigt et al. | |
| 7,545,969 B2 | 6/2009 | Bennett | |
| 7,624,092 B2 | 11/2009 | Lieske et al. | |
| 7,627,544 B2 | 12/2009 | Chkodrov | |
| 7,756,808 B2 | 7/2010 | Weigt et al. | |
| 7,756,809 B2 | 7/2010 | Weigt et al. | |
| 7,761,396 B2 | 7/2010 | Weigt et al. | |
| 7,783,723 B2 | 8/2010 | Peng et al. | |

(Continued)

OTHER PUBLICATIONS

Office Action in related U.S. Appl. No. 15/216,201 dated Mar. 7, 2018; 14 pages.

(Continued)

*Primary Examiner* — Khalil Naghdali
*Assistant Examiner* — Shaqueal D Wade
(74) *Attorney, Agent, or Firm* — Fish & Richardson P.C.

(57) ABSTRACT

The present disclosure describes methods, systems, and computer program products for performing a frequency domain analysis of activity data for a computer system. One computer-implemented method receiving time domain activity data for a computer system, wherein the time domain activity data comprise activity records associated with the computer system in a time domain; computing, by a hardware processor, frequency domain activity data based on the time domain activity data; and displaying the frequency domain activity data.

14 Claims, 12 Drawing Sheets

(56) References Cited

U.S. PATENT DOCUMENTS

| | | |
|---|---|---|
| 7,788,718 B1 | 8/2010 | Fei |
| 7,872,982 B2 | 1/2011 | Atkins |
| 7,908,660 B2 | 3/2011 | Bahl |
| 7,934,257 B1 | 4/2011 | Kienzle |
| 7,961,633 B2 | 6/2011 | Shankar |
| 7,971,209 B2 | 6/2011 | Eberlein et al. |
| 8,051,034 B2 | 11/2011 | Mehta et al. |
| 8,091,117 B2 | 1/2012 | Williams |
| 8,474,047 B2 | 6/2013 | Adelstein |
| 8,484,726 B1 | 7/2013 | Sutton |
| 8,554,907 B1 | 10/2013 | Chen et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 8,973,147 B2 | 3/2015 | Pearcy |
| 9,037,678 B2 | 5/2015 | Mehta et al. |
| 9,075,633 B2 | 7/2015 | Nos |
| 9,106,697 B2 * | 8/2015 | Capalik .............. H04L 63/1491 |
| 9,116,906 B2 | 8/2015 | Nos et al. |
| 9,148,488 B2 | 9/2015 | Rabetge et al. |
| 9,170,951 B1 | 10/2015 | He |
| 9,251,011 B2 | 2/2016 | Meier et al. |
| 9,262,519 B1 | 2/2016 | Saurabh |
| 9,304,978 B2 | 4/2016 | Bezrukov et al. |
| 9,313,421 B2 | 4/2016 | Deshpande |
| 9,336,385 B1 | 5/2016 | Spencer |
| 9,348,665 B2 | 5/2016 | Storz et al. |
| 9,383,934 B1 | 7/2016 | Likacs |
| 9,419,989 B2 | 8/2016 | Harris |
| 9,524,389 B1 | 12/2016 | Roth |
| 9,619,984 B2 | 4/2017 | Donovan |
| 9,690,931 B1 | 6/2017 | Anantharaju et al. |
| 9,779,147 B1 | 10/2017 | Sherman et al. |
| 9,779,150 B1 | 10/2017 | Sherman |
| 9,843,596 B1 | 12/2017 | Averbuch |
| 9,979,741 B2 * | 5/2018 | Fehrman .............. H04L 63/1425 |
| 10,001,389 B1 * | 6/2018 | Das ....................... G01D 4/002 |
| 10,079,842 B1 | 9/2018 | Brandwine et al. |
| 10,102,379 B1 | 10/2018 | Seifert et al. |
| 10,140,447 B2 | 11/2018 | Rahaman et al. |
| 10,148,675 B1 | 12/2018 | Brandwine et al. |
| 2002/0070953 A1 | 6/2002 | Barg |
| 2003/0074471 A1 | 4/2003 | Anderson |
| 2003/0115484 A1 | 6/2003 | Mariconi et al. |
| 2003/0217137 A1 | 11/2003 | Roese |
| 2004/0015481 A1 | 1/2004 | Zinda |
| 2004/0044912 A1 | 3/2004 | Connary |
| 2004/0078490 A1 | 4/2004 | Anderson |
| 2004/0093513 A1 | 5/2004 | Cantrell |
| 2006/0037075 A1 | 2/2006 | Frattura |
| 2006/0059115 A1 | 3/2006 | Gulfleisch et al. |
| 2006/0106847 A1 | 5/2006 | Eckardt et al. |
| 2006/0161816 A1 | 7/2006 | Gula et al. |
| 2006/0218140 A1 | 9/2006 | Whitney |
| 2006/0253907 A1 | 11/2006 | McConnell |
| 2007/0067438 A1 | 3/2007 | Goranson et al. |
| 2007/0073519 A1 | 3/2007 | Long |
| 2007/0100905 A1 | 5/2007 | Masters et al. |
| 2007/0115998 A1 | 5/2007 | McEligott |
| 2007/0136437 A1 | 6/2007 | Shankar et al. |
| 2007/0150596 A1 | 6/2007 | Miller et al. |
| 2007/0183389 A1 | 8/2007 | Clee |
| 2007/0186284 A1 | 8/2007 | McConnell |
| 2007/0266387 A1 | 11/2007 | Henmi |
| 2007/0283192 A1 | 12/2007 | Shevchenko |
| 2007/0300296 A1 | 12/2007 | Kudla |
| 2008/0033966 A1 | 2/2008 | Wahl |
| 2008/0034425 A1 | 2/2008 | Overcash et al. |
| 2008/0080384 A1 | 4/2008 | Atkins |
| 2008/0091681 A1 | 4/2008 | Dwivedi |
| 2008/0163085 A1 | 7/2008 | Subbu et al. |
| 2008/0288889 A1 | 11/2008 | Hunt et al. |
| 2008/0295173 A1 | 11/2008 | Tsvetanov |
| 2008/0320552 A1 | 12/2008 | Kumar |
| 2009/0044277 A1 | 2/2009 | Aaron et al. |
| 2009/0049518 A1 | 2/2009 | Roman |
| 2009/0288164 A1 | 11/2009 | Adelstein |
| 2009/0293046 A1 | 11/2009 | Cheriton |
| 2009/0300045 A1 | 12/2009 | Chaudhry et al. |
| 2009/0312026 A1 | 12/2009 | Parameswar |
| 2010/0011031 A1 | 1/2010 | Huang |
| 2010/0114832 A1 | 5/2010 | Lillibridge |
| 2010/0180325 A1 | 7/2010 | Golobay |
| 2011/0098928 A1 | 4/2011 | Hoffman et al. |
| 2011/0213741 A1 | 9/2011 | Shama |
| 2011/0277034 A1 | 11/2011 | Hanson |
| 2011/0320816 A1 | 12/2011 | Yao |
| 2012/0005542 A1 | 1/2012 | Petersen |
| 2012/0158653 A1 | 6/2012 | Shaffer et al. |
| 2012/0167161 A1 | 6/2012 | Kim et al. |
| 2012/0191660 A1 | 7/2012 | Hoog |
| 2012/0210434 A1 | 8/2012 | Curtis et al. |
| 2012/0271748 A1 | 10/2012 | DiSalvo |
| 2012/0271790 A1 | 10/2012 | Lappas et al. |
| 2012/0317078 A1 | 12/2012 | Zhou et al. |
| 2013/0086023 A1 | 4/2013 | Tsukamoto et al. |
| 2013/0106830 A1 | 5/2013 | de Loera |
| 2013/0198840 A1 | 8/2013 | Drissi et al. |
| 2013/0212709 A1 | 8/2013 | Tucker |
| 2013/0262311 A1 | 10/2013 | Buhrmann |
| 2013/0298243 A1 | 11/2013 | Kumar et al. |
| 2013/0304665 A1 | 11/2013 | Rodeck et al. |
| 2013/0304666 A1 | 11/2013 | Rodeck et al. |
| 2013/0305369 A1 | 11/2013 | Karta |
| 2013/0326079 A1 | 12/2013 | Seifert et al. |
| 2013/0347111 A1 | 12/2013 | Karta |
| 2014/0047413 A1 | 2/2014 | Sheive et al. |
| 2014/0201836 A1 | 7/2014 | Amsler |
| 2014/0223283 A1 | 8/2014 | Hancock |
| 2014/0244623 A1 | 8/2014 | King |
| 2014/0317681 A1 | 10/2014 | Shende |
| 2015/0007325 A1 | 1/2015 | Eliseev |
| 2015/0067880 A1 | 3/2015 | Ward |
| 2015/0073868 A1 | 3/2015 | Garman |
| 2015/0106867 A1 | 4/2015 | Liang |
| 2015/0143521 A1 | 5/2015 | Eliseev |
| 2015/0154524 A1 | 6/2015 | Borodow |
| 2015/0180891 A1 | 6/2015 | Seward |
| 2015/0215329 A1 | 7/2015 | Singla |
| 2015/0237065 A1 | 8/2015 | Roytman |
| 2015/0264011 A1 | 9/2015 | Liang |
| 2015/0278371 A1 | 10/2015 | Anand |
| 2015/0281278 A1 | 10/2015 | Gooding |
| 2015/0310070 A1 | 10/2015 | Stefik et al. |
| 2015/0319185 A1 | 11/2015 | Kirti |
| 2015/0341389 A1 | 11/2015 | Kurakami |
| 2015/0347751 A1 | 12/2015 | Card et al. |
| 2015/0355957 A1 | 12/2015 | Steiner |
| 2015/0358344 A1 | 12/2015 | Mumcuoglu |
| 2015/0381646 A1 | 12/2015 | Lin |
| 2016/0057166 A1 | 2/2016 | Chesla |
| 2016/0057167 A1 | 2/2016 | Bach et al. |
| 2016/0065594 A1 | 3/2016 | Srivastava et al. |
| 2016/0092535 A1 | 3/2016 | Kuchibhotla et al. |
| 2016/0127391 A1 | 5/2016 | Kobres |
| 2016/0164891 A1 | 6/2016 | Satish et al. |
| 2016/0202893 A1 * | 7/2016 | Mustonen ........... G06F 3/04847 715/771 |
| 2016/0226905 A1 | 8/2016 | Baikalov et al. |
| 2016/0248798 A1 | 8/2016 | Cabrera et al. |
| 2016/0291982 A1 | 10/2016 | Mizrahi |
| 2016/0292061 A1 | 10/2016 | Marron |
| 2016/0337384 A1 | 11/2016 | Jansson |
| 2016/0359886 A1 | 12/2016 | Yadav et al. |
| 2016/0364315 A1 | 12/2016 | Lee |
| 2016/0364571 A1 | 12/2016 | Lee |
| 2016/0364740 A1 | 12/2016 | Parker |
| 2016/0373476 A1 | 12/2016 | Dell'anno et al. |
| 2016/0378978 A1 | 12/2016 | Singla |
| 2016/0381049 A1 | 12/2016 | Lakhani |
| 2017/0004005 A1 | 1/2017 | Elliott |
| 2017/0026400 A1 | 1/2017 | Adams et al. |
| 2017/0031002 A1 | 2/2017 | Newton et al. |

(56) References Cited

U.S. PATENT DOCUMENTS

| | | |
|---|---|---|
| 2017/0034023 A1 | 2/2017 | Nickolov |
| 2017/0070415 A1 | 3/2017 | Bell et al. |
| 2017/0091008 A1 | 3/2017 | Cherbakov |
| 2017/0093902 A1 | 3/2017 | Roundy et al. |
| 2017/0148060 A1 | 5/2017 | Showers |
| 2017/0169217 A1 | 6/2017 | Rahaman |
| 2017/0251365 A1 | 8/2017 | Burchard |
| 2017/0270006 A1 | 9/2017 | Kankylas |
| 2017/0279837 A1 | 9/2017 | Dasgupta |
| 2017/0287179 A1 | 10/2017 | Tibshirani et al. |
| 2017/0302685 A1 | 10/2017 | Ladnai et al. |
| 2017/0308602 A1 | 10/2017 | Raghunathan et al. |
| 2017/0310690 A1 | 10/2017 | Mestha et al. |
| 2017/0316026 A1 | 11/2017 | Kanthak et al. |
| 2017/0322993 A1 | 11/2017 | Brodt et al. |
| 2017/0324766 A1 | 11/2017 | Gonzalez |
| 2018/0027002 A1 | 1/2018 | Rodeck et al. |
| 2018/0027010 A1 | 1/2018 | Pritzkau et al. |
| 2018/0059876 A1 | 3/2018 | Peng et al. |
| 2018/0063167 A1 | 3/2018 | Rodeck |
| 2018/0091535 A1 | 3/2018 | Chrosziel |
| 2018/0091536 A1 | 3/2018 | Chrosziel et al. |
| 2018/0157835 A1 | 6/2018 | Nos |
| 2018/0173872 A1 | 6/2018 | Lam et al. |
| 2018/0173873 A1 | 6/2018 | Hassforther et al. |
| 2018/0176234 A1 | 6/2018 | Kunz et al. |
| 2018/0176235 A1 | 6/2018 | Lam et al. |
| 2018/0234447 A1* | 8/2018 | Mueen .................. G06Q 50/01 |
| 2019/0005423 A1 | 1/2019 | Pritzkau et al. |
| 2019/0007435 A1 | 1/2019 | Pritzkau et al. |

OTHER PUBLICATIONS

Office Action in related U.S. Appl. No. 15/274,569 dated Apr. 16, 2018; 11 pages.

Non-Final Office Action issued in U.S. Appl. No. 15/216,046 dated Apr. 29, 2019, 23 pages.

Non-Final Office Action issued in U.S. Appl. No. 15/246,053 dated May 17, 2019, 28 pages.

Schumacher, "An effective way to bring SAP Security Notes under control," Virtual Forge GmbH, Feb. 2017, https://blog.virtualforge.com/en/an-effective-way-to-bring-sap-security-notes-under-control, 4 pages.

U.S. Office Action in related U.S. Appl. No. 15/274,693 dated Jul. 26, 2018, 14 pages.

U.S. Office Action in related U.S. Appl. No. 15/370,084 dated Aug. 27, 2018, 14 pages.

U.S. Office Action in related U.S. Appl. No. 15/383,771 dated Aug. 3, 2018, 12 pages.

U.S. Office Action in related U.S. Appl. No. 15/216,201 dated Jul. 20, 2018, 15 pages.

U.S. Office Action in related U.S. Appl. No. 15/246,053 dated May 21, 2018, 14 pages.

U.S. Office Action in related U.S. Appl. No. 15/246,053 dated Sep. 24, 2018, 14 pages.

U.S. Office Action in related U.S. Appl. No. 15/253,438 dated Sep. 19, 2018, 17 pages.

U.S. Office Action in related U.S. Appl. No. 15/274,569 dated Nov. 14, 2018, 11 pages.

U.S. Office Action in related U.S. Appl. No. 15/380,379 dated Jul. 19, 2018, 9 pages.

U.S. Office Action in related U.S. Appl. No. 15/381,567 dated Nov. 2, 2018, 17 pages.

U.S. Office Action in related U.S. Appl. No. 15/383,771 dated Jan. 23, 2019, 14 pages.

Final Office Action issued in U.S. Appl. No. 15/274,693 dated Feb. 11, 2019, 19 pages.

Final Office Action issued in U.S. Appl. No. 15/370,084 dated Feb. 4, 2019, 16 pages.

Non-Final Office Action issued in U.S. Appl. No. 15/274,569 dated Mar. 22, 2019, 11 pages.

Final Office Action issued in U.S. Appl. No. 15/381,567 dated May 22, 2019, 28 pages.

Office Action issued in U.S. Appl. No. 15/216,046 dated Aug. 21, 2019, 23 pages.

Non-Final Office Action issued in U.S. Appl. No. 15/639,863 dated Jun. 24, 2019, 37 pages.

Office Action issued in U.S. Appl. No. 15/847,478, dated Aug. 6, 2019, 36 pages.

U.S. Office Action in related U.S. Appl. No. 15/383,771 dated Jul. 5, 2019, 16 pages.

Non-final office action issued in U.S. Appl. No. 15/381,567 dated Oct. 7, 2019, 16 pages.

* cited by examiner

USING FREQUENCY ANALYSIS IN ENTERPRISE THREAT DETECTION TO DETECT INTRUSIONS IN A COMPUTER SYSTEM

BACKGROUND

Enterprise threat detection (ETD) typically collects and stores a large amount/large sets of log data associated with various heterogeneous systems (often referred to as "big data"). The collected log data is usually analyzed using forensic-type data analysis tools to identify suspicious behavior based on log events and to allow an appropriate response. In some cases, a computer system may be intruded by a malicious attacker that executes jobs that may compromise the confidentially, integrity, or availability of the computer system. Malicious activities can be identified and distinguished from normal, non-malicious, activities based on comparisons of frequency characteristics of detected events.

SUMMARY

The present disclosure describes methods and systems, including computer-implemented methods, computer program products, and computer systems for using frequency analysis to detect intrusions in a computer system.

In an implementation, a computer-implemented method includes receiving time domain activity data for a computer system, wherein the time domain activity data comprise activity records associated with the computer system in a time domain; computing, by a hardware processor, frequency domain activity data based on the time domain activity data; and displaying the frequency domain activity data.

The foregoing and other described implementations can each optionally include one or more of the following features, alone or in combination:

A first aspect, combinable with the general implementation, wherein the frequency domain activity data are computed using Fourier Transform.

A second aspect, combinable with the general implementation, wherein computing, by the hardware processor, frequency domain activity data based on the time domain activity data comprise: grouping the time domain activity data into a plurality of groups, each of the plurality of groups comprises time domain activity data in a time period; and for each of the groups, computing frequency domain activity data based on the time domain activity data in the respective group.

A third aspect, combinable with the general implementation, wherein the frequency domain activity data for each group are displayed consecutively.

A fourth aspect, combinable with the general implementation, wherein the frequency domain activity data for each group are displayed using an animated format.

A fifth aspect, combinable with the general implementation, further comprising: determining a maximum amplitudes of the frequency domain activity data; and displaying a user interface object indicating the maximum amplitude.

A sixth aspect, combinable with the general implementation, wherein the activity records indicate time at which jobs are executed on the computer system.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/instructions stored on the non-transitory, computer-readable medium.

The subject matter described in this specification can be implemented in particular implementations so as to realize one or more of the following advantages. For example, the frequency analysis of the activity data can distinguish events occurring on a computer system at regular interval, which may correspond to malicious attacks, from events that are randomly occurring, which may correspond to authorized operations. Furthermore, the frequency analysis can detect change of periodicities of events occurring on a computer system. In addition, displaying frequency analysis data in a consecutive manner helps to distinguish changes of amplitudes or patterns of the frequency of the events. These approaches, individually or in combination, make it easy to identify malicious attacks on a computer system and increase security of the computer system. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
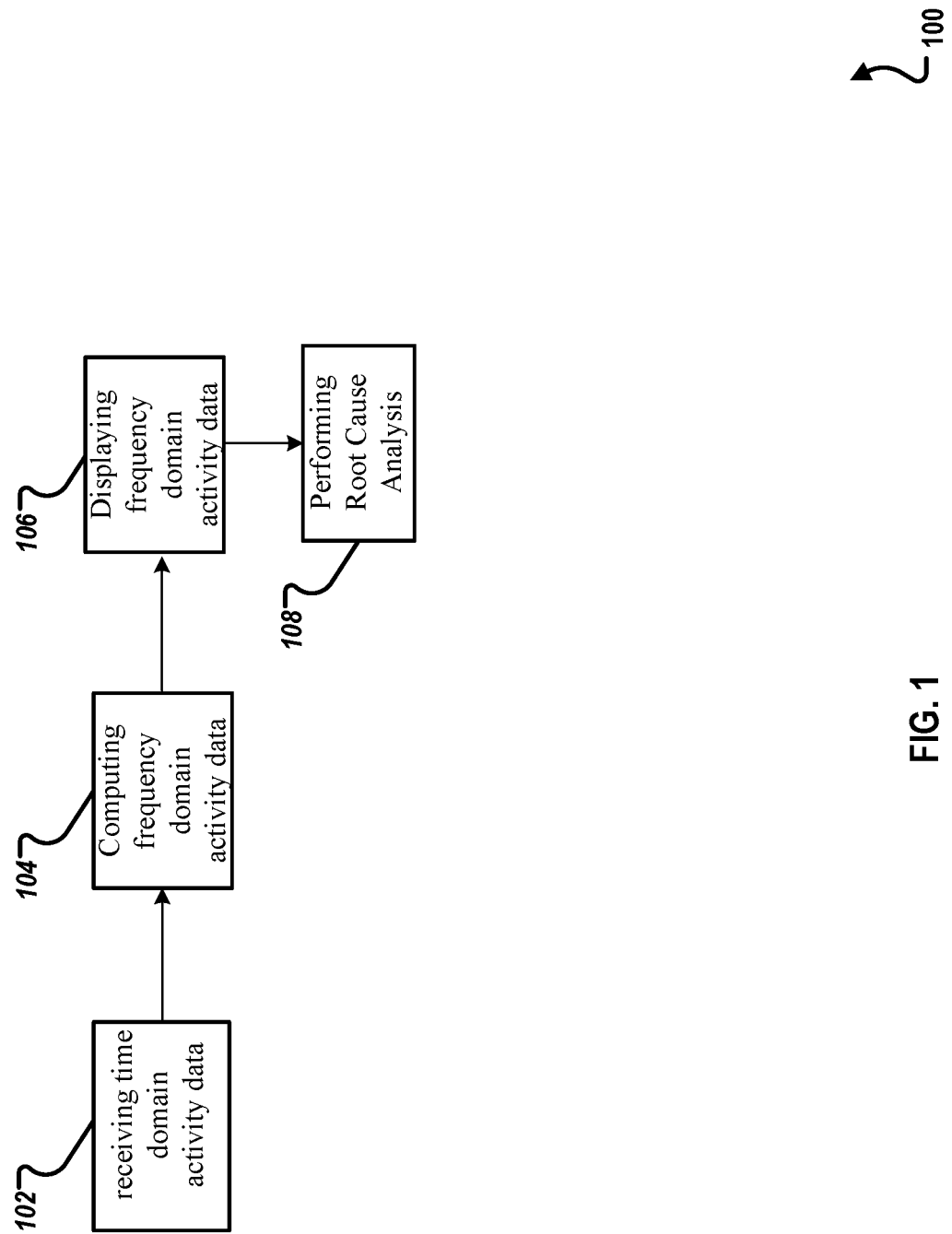
FIG. 1 is a block diagram illustrating a high-level process for performing a frequency domain analysis of activity data for a computer system, according to an implementation.

The following detailed description describes using frequency analysis to detect intrusions in a computer system, and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications, without departing from scope of the disclosure. Thus, the present disclosure is not intended to be limited to the described or illustrated implementations, but is to be accorded the widest scope consistent with the principles and features disclosed herein.

Enterprise threat detection (ETD) typically collects and stores a large amount/large sets of log data associated with various heterogeneous systems (often referred to as "big data"). The collected log data is usually analyzed using forensic-type data analysis tools to identify suspicious behavior based on log events and to allow an appropriate response. In some cases, a computer system may be intruded by a malicious attacker that executes jobs that may compromise the confidentially, integrity, or availability of the computer system.

In some cases, standard detection methods for identifying unauthorized intrusions into a computer system may be insufficient. For example, a malicious attacker may use a legitimate user's credentials to log onto the computer system and execute a malicious job on the computer system. The malicious job may harm the confidentially, integrity, availability, or any combinations thereof, of the computer system. Since the legitimate user's credentials are compromised, the malicious attacker can log back to the system and execute the malicious job again. If the malicious attacker does not log on the system frequently enough, a conventional intrusion detection system may fail to detect it. In some cases, the malicious attacker can execute a script that logs onto the system regularly to execute the malicious job. In some cases, the malicious attacker can log onto the computer system and install a script that performs the malicious job on a regular interval. Therefore, the malicious attacker would only login once and may not trigger the intrusion detection system focused on login behavior. Furthermore, the malicious job can be executed in the background to reduce its exposure. In addition, the malicious job can perform tasks that are similar to an authorized job, for example, updating data, which harms the computer system and may be difficult to detect and repair.

In the above-identified cases, the use of frequency analysis with activity data can help identify malicious activity. A frequency analysis of the activity data can detect unusual behaviors such as addition of periodic events, changes of periodicity of events, or a combination thereof. The frequency domain activity data can be analyzed by the intrusion detection system and displayed in a user interface of the intrusion detection system. In some cases, the frequency domain activity data can be displayed consecutively, in an animated and interactive format (for example, in a graphical user interface (GUI) permitting a user to select and manipulate the activity data).

FIG. 1 is a block diagram illustrating a high-level process 100 for performing a frequency domain analysis of activity data for a computer system, according to an implementation. As illustrated, the process 100 begins at 102, where time domain activity data for a computer system are received at the intrusion detection system. In some cases, the computer system can be a software system, a hardware system, or a combination thereof, that is monitored for intrusion detections. In some cases, the computer system can be owned, operated, managed, used, or any combinations thereof, by an enterprise. Examples of the computer system include a computer data storage system, for example, a database or a file system, that stores data, a computer network that provides communication capabilities to a number of devices, a cloud computing system that provides software services to users, or the like.

Time domain activity data includes activity records for the computer system in a time domain. The activity records indicate events associated with the computer system. For example, the activity records can include access records of the computer system, for example, the number and time of logins by one or more users, by one or more devices, from one or more physical locations or internet protocol (IP) addresses. The activity records can also include operational records of the computer system, for example, the information related to jobs that are launched on the computer system. The information can include the starting and finishing time of the jobs, the resource, for example, the processing time and memory consumed by the jobs, and other similar information.

In some cases, the time domain activity data includes filtered activity records. For example, the received time domain activity data can be filtered for events associated with one or more particular users to be monitored, one or more particular jobs or types of jobs to be monitored, or any other criteria. In some cases, the filtering operation can be performed automatically. For example, a log file that includes raw activity records can be received. The raw activity records can be filtered based on one or more configured criteria, for example, user, job, or any other criteria. In some cases, a list of criteria can be displayed on a user interface of a computer and an administrator can select the one or more criteria for filtering. The raw activity records can be filtered based on the selected criteria to generate the time domain activity data.

The time domain activity data indicate events in a time domain. For example, the time domain activity data indicates the time when a login event or a job execution event, takes place. In some cases, the time domain activity data can be received periodically. For example, an event that takes place on the computer system can be logged and the logged information gathered periodically. Alternatively, or additionally, time domain activity data over a time period can be retrieved when an intrusion detection analysis is performed.

From 102, process 100 proceeds to 104, where the frequency domain activity data is computed based on the time domain activity data. In some cases, a Fourier Transform can be applied to the time domain activity data to generate the frequency domain activity data. The frequency domain activity data can also be computed using a correlation function.

Figure 2:
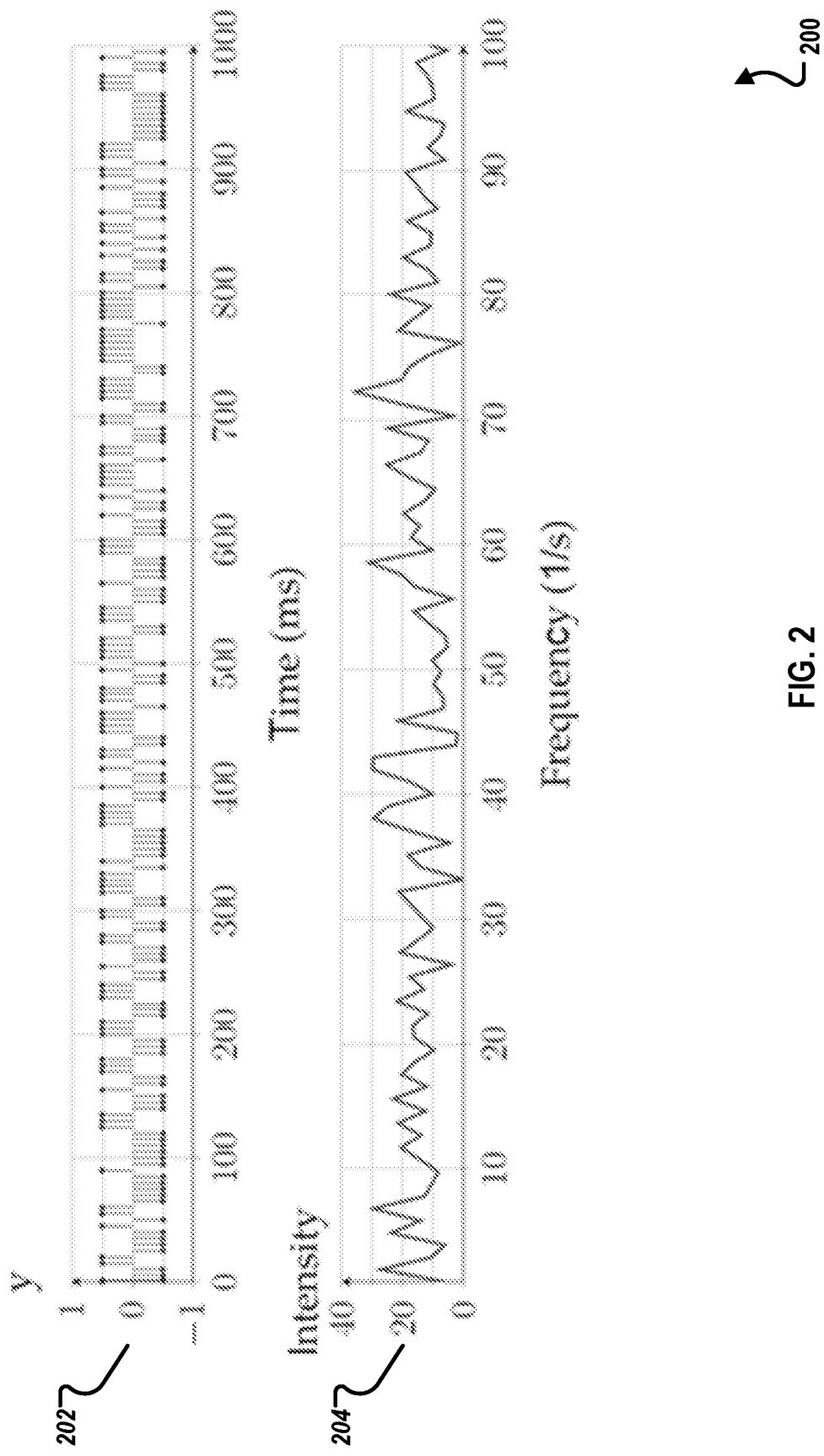
FIG. 2 is a schematic diagram of frequency and time domain activity data, according to an implementation.

FIG. 2 is a schematic diagram 200 of frequency and time domain activity data, according to an implementation. The schematic diagram 200 includes a graph 202 for the time domain activity data and a graph 204 for the frequency domain activity data. In the illustrated example, graph 202 represents random events (here, taking a value of −1 or 1) that takes place at random times during a 1000 millisecond (ms) time period. Graph 204 represents the frequency domain transformation of the events in graph 202. As illustrated, the graph 204 presents frequency activity data across the spectrum, with no clear indication of a particular frequency.

If a user account with such random behavior is compromised or misused by the legitimate user, the frequency domain activity data may display a different pattern. In one example, a malicious attacker may obtain access to the computer system using the login credentials of the user. The malicious attack may install a script on the computer system. The script can launch a malicious job at regular interval on the computer system. In some cases, the malicious job can be executed in the background of the computer system, which makes it more difficult to be detected by other users.

The malicious job can include recording and sending information to the attacker periodically. The periodic nature of the malicious job can be difficult to detect on a time domain graph, for example, graph 202, but can be easier to detect using a frequency domain analysis.

Figure 3:
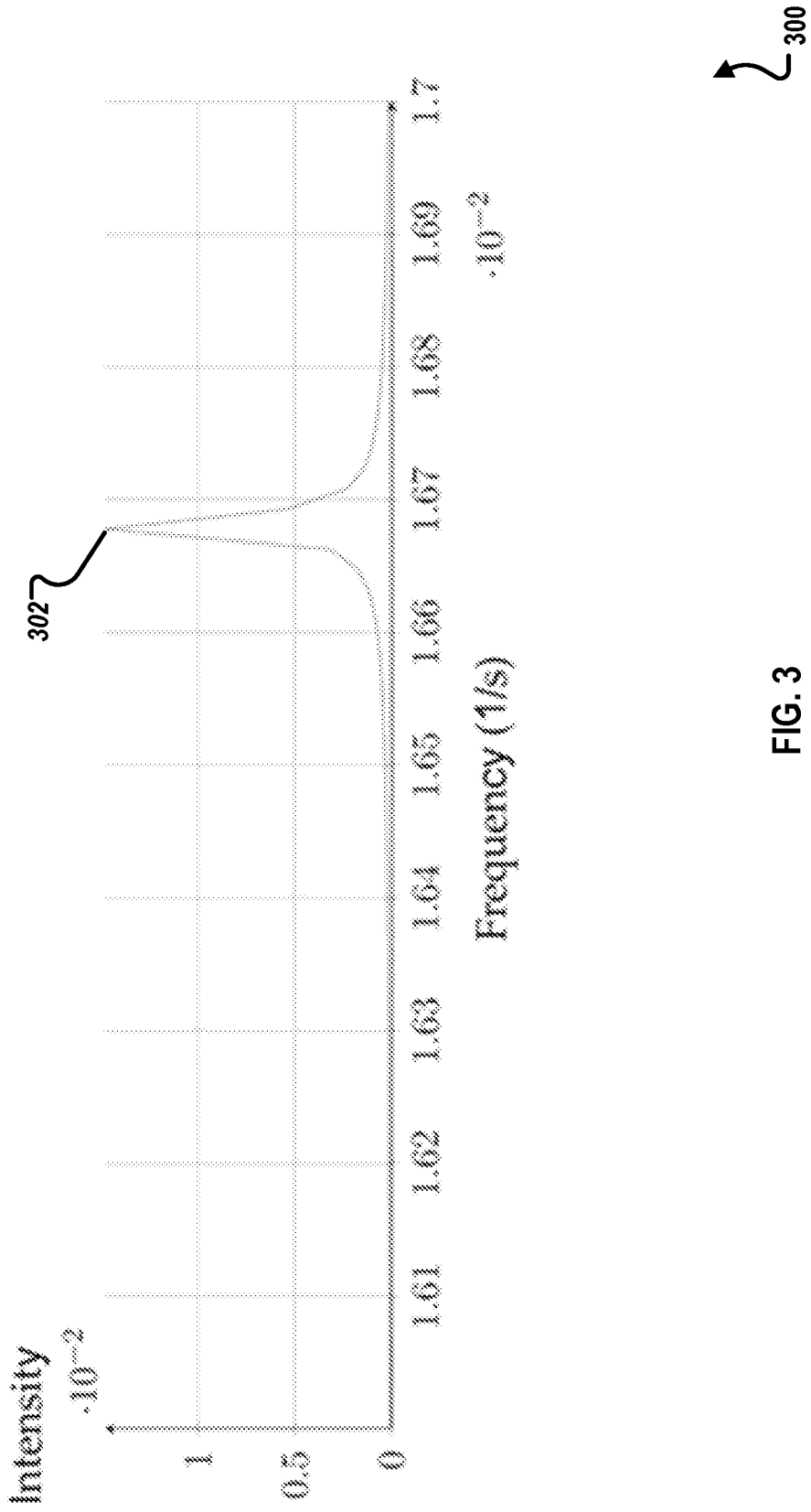
FIG. 3 is a graph representing frequency domain activity data of a periodic event, according to an implementation.

FIG. 3 is a graph 300 representing frequency domain activity data of a periodic event, according to an implementation. As illustrated, the graph 300 includes a sharp peak 302 at $1.66 \times 10^{-2}$ Hz, which corresponds to once every 60 seconds, that is, 1 minute.

Figure 4:
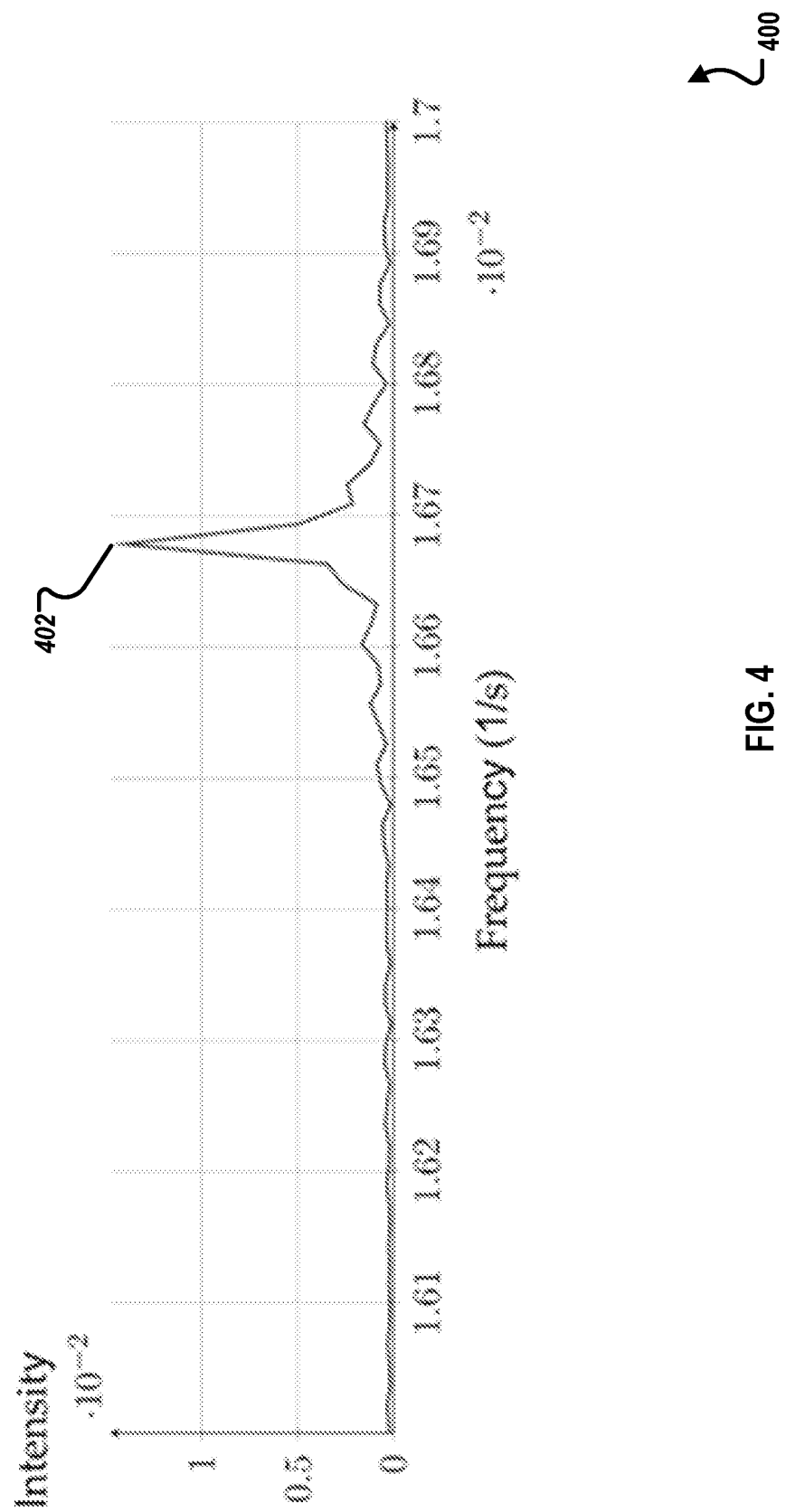
FIG. 4 is a graph representing frequency domain activity data of a periodic event combined with random events, according to an implementation.

FIG. 4 is a graph 400 representing frequency domain activity data of a periodic event combined with random events, according to an implementation. If the random events described in FIG. 2 take place in addition to the periodic event, the graph representation of the frequency domain activity data can include random frequency activity across the spectrum, which is similar to the graph 204, in combination with a sharp peak 402, representing the periodic activity of the malicious job.

Therefore, by using a frequency domain analysis, an event that occurs at random intervals can be distinguished over other activity. The event can therefore be identified and further analyzed to determine whether there is a security risk associated with the event.

Figure 5A:
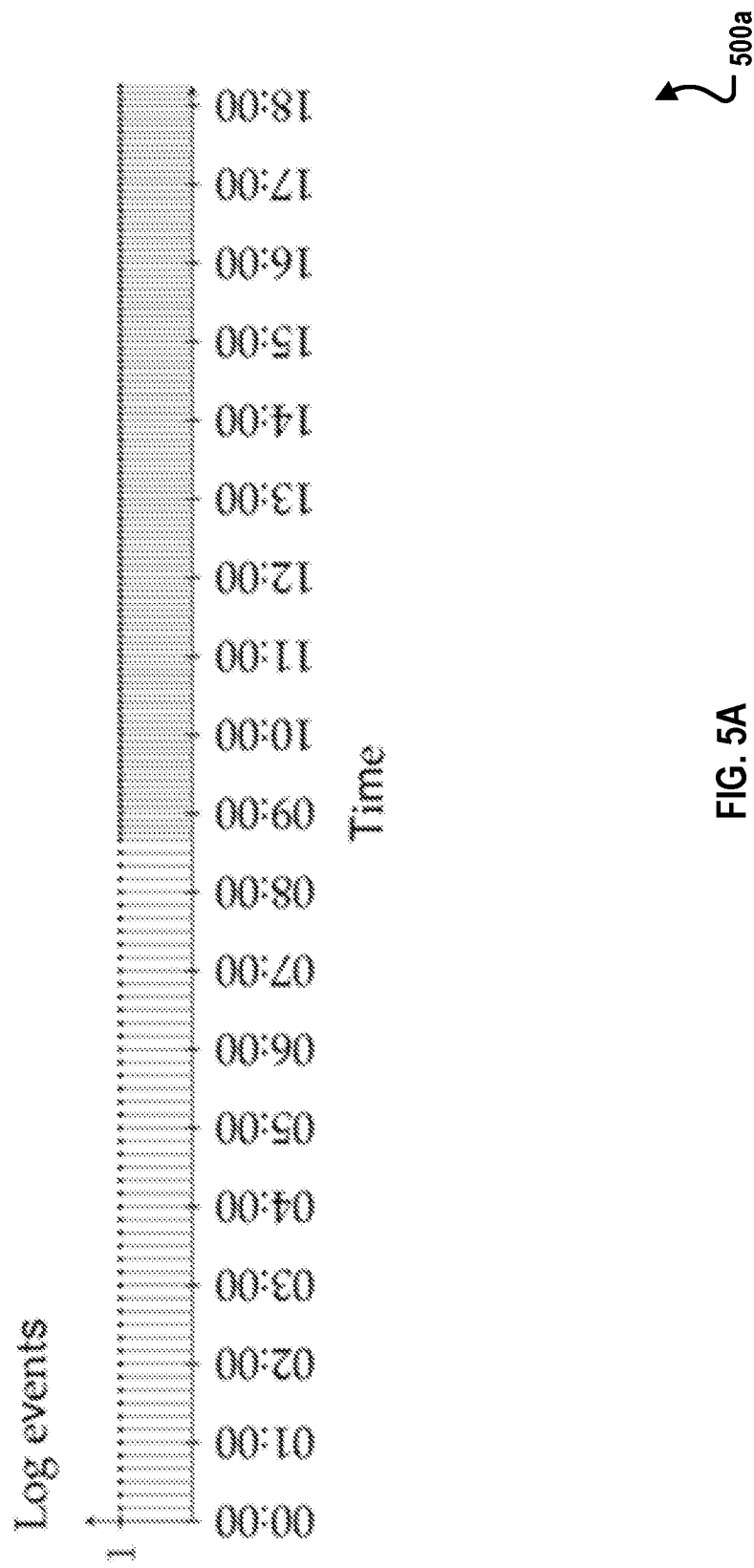
FIG. 5A-5D are groups illustrating changes of periodicities of events, according to an implementation.
Figure 5B:
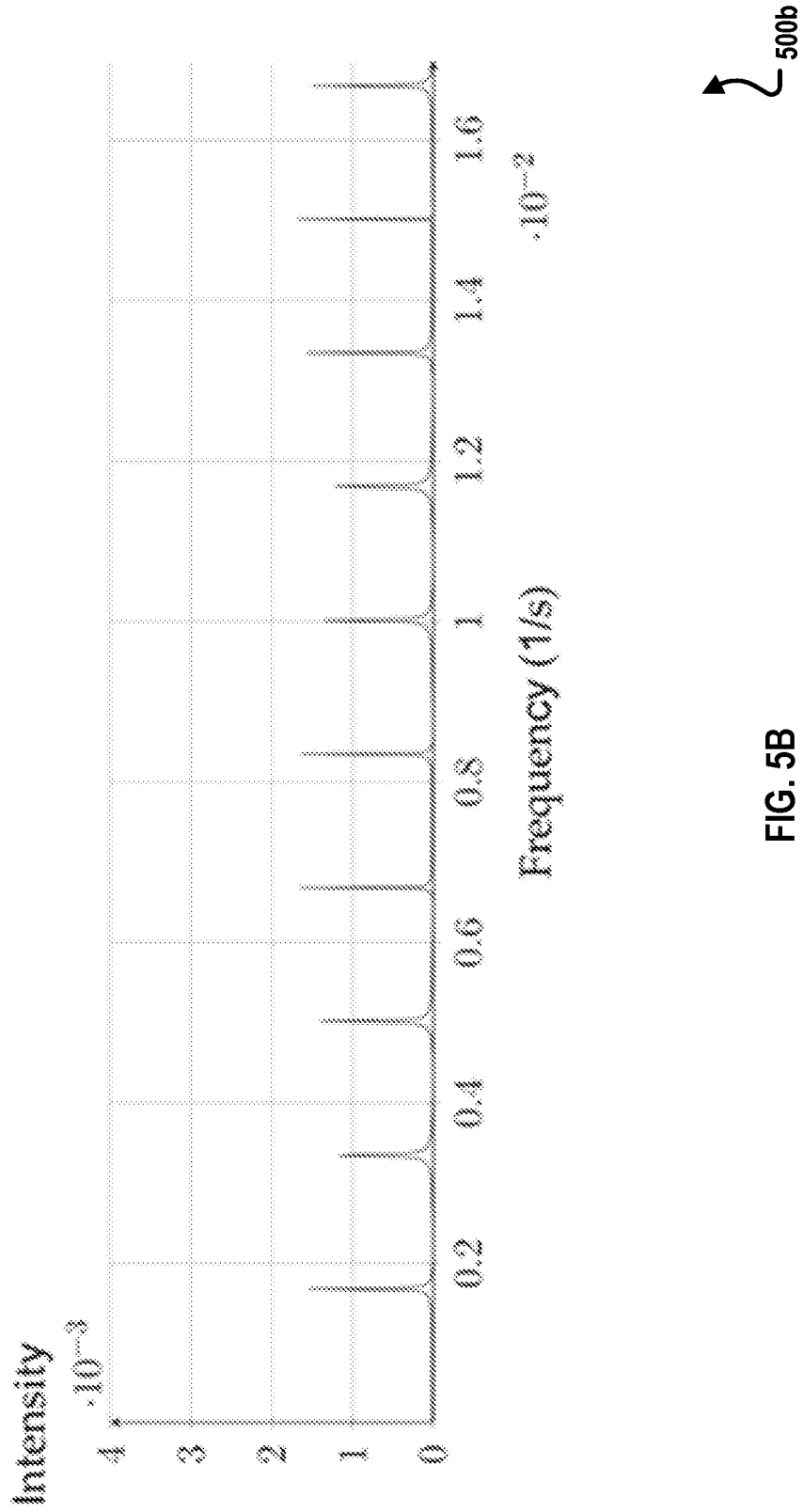
Figure 5C:
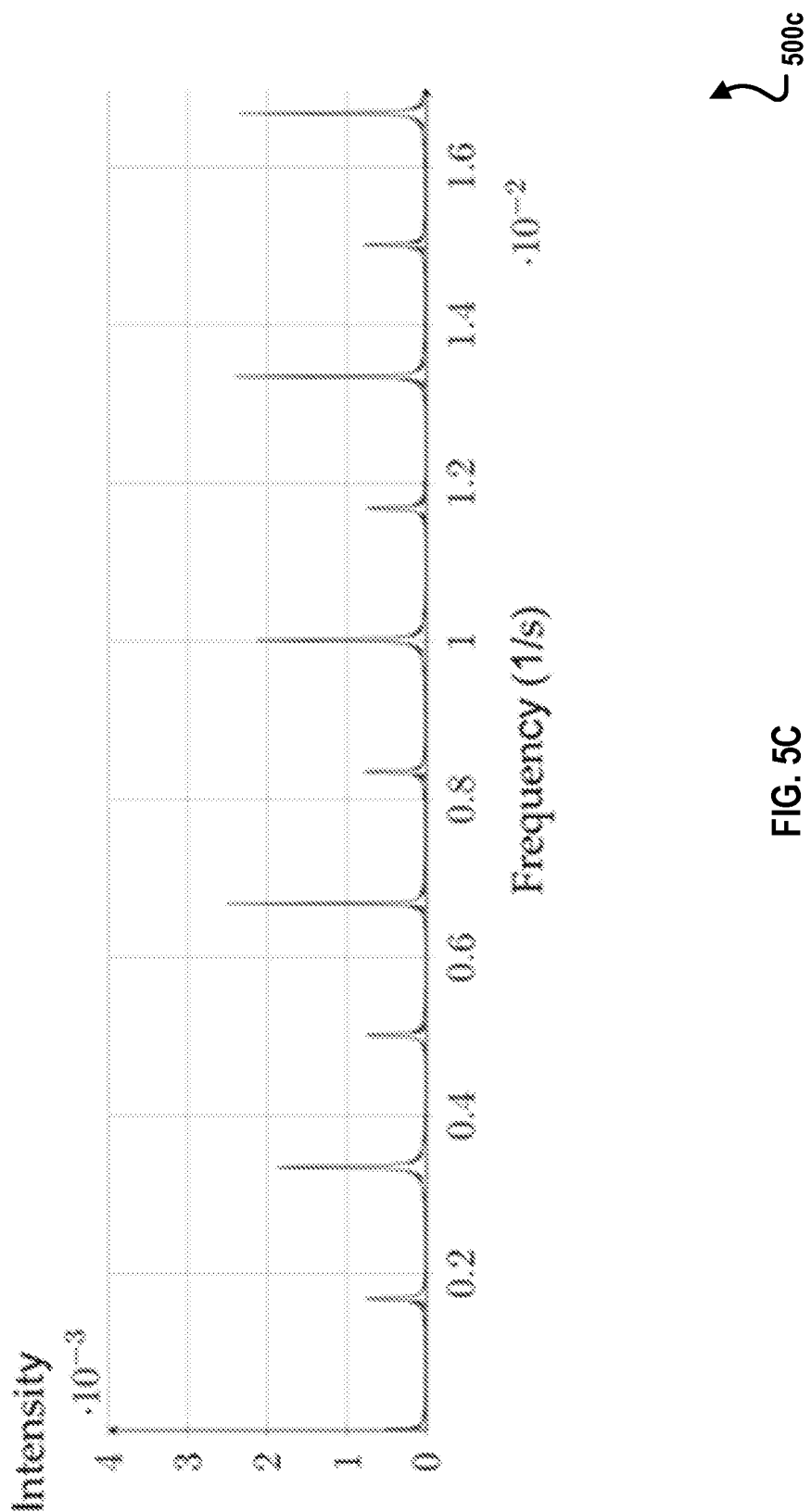
Figure 5D:
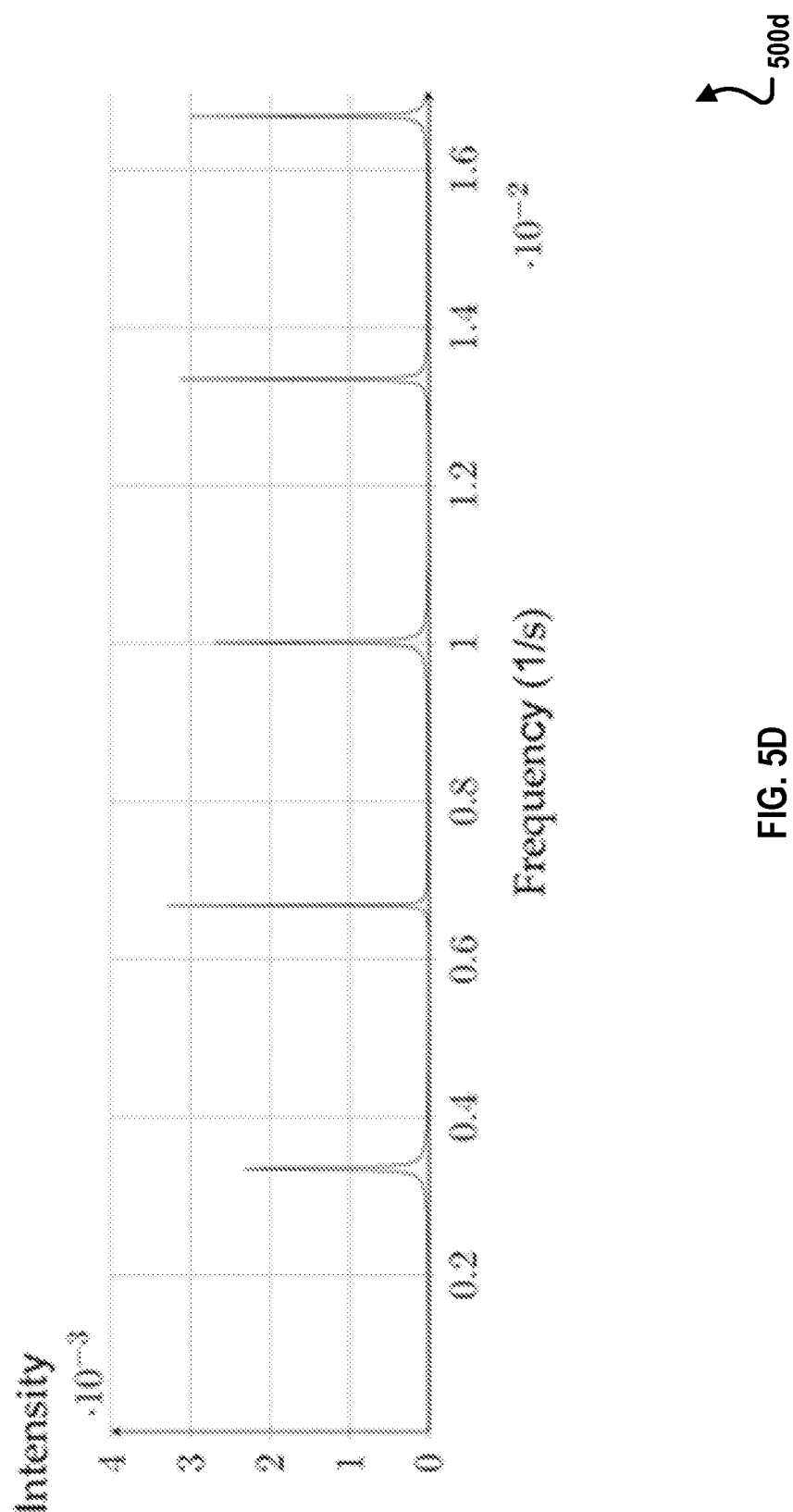

FIGS. 5A-5D are graphs 500a-500d illustrating changes of periodicities of events, according to an implementation. In some cases, a frequency analysis of the activity data can also indicate a change of activities. The change of periodicity can be caused by an authorized job executed at a first interval, combined with a malicious job executed at a second interval. In some cases, the second interval can overlap with the first interval, which makes it difficult to detect based on time domain activity data. FIG. 5A is a graph 500a illustrating changes of periodicities in a time domain, according to an implementation. As illustrated in the graph 500a, prior to 8:40, a job was first executed every 10 minutes. After 8:40, the job was executed every 5 minutes. FIG. 5B is a graph 500b illustrating activity data prior to the change in a frequency domain, according to an implementation. As shown in the graph 500b, the frequency activity includes peaks at $1.66 \times 10^{-3}$ Hz, which corresponds to a period of 10 minutes. The graph 500b also includes harmonics, e.g., peaks at multiple of $1.66 \times 10^{-3}$ Hz, that are generated due to the time window, e.g., 25 hours, used in performing the frequency analysis. FIG. 5C is a graph 500c illustrating changes of periodicities in a frequency domain, according to an implementation. As shown in the graph 500c, similar to 500b, the frequency activity data include peaks at multiples of $1.66 \times 10^{-3}$ Hz, representing the jobs executed prior to the changes. The frequency activity data also include peaks at multiples of $3.33 \times 10^{-3}$ Hz that have double the intensity of the peaks at multiples of $1.66 \times 10^{-3}$ Hz. This increasing intensity corresponds to the doubling of the frequency of the jobs executed at every 5 minutes after the change. In other words, because a job is executed twice as often, there are twice as many data points and therefore the intensity doubles. FIG. 5D is a graph 500d illustrating activity data after the change in a frequency domain, according to an implementation. As illustrated, after the change, the frequency activity data include peaks at multiples of $3.33 \times 10^{-3}$ Hz, where the intensity is doubled. Therefore, by analyzing the intensity of activity data in the frequency domain, a change of periodicity of events, can be detected.

Returning to FIG. 1, from 104, process 100 proceeds to 106, where the frequency domain activity data are displayed at the intrusion detection system. In some cases, the frequency activity data can be computed for different time periods and compared. For example, the time domain activity data can include activity data for multiple time periods. In this example, the time domain activity data can be divided into multiple groups, each corresponding to one particular time period. A frequency domain transformation can be performed for the time domain activity data in each group to generate frequency domain activity data for each group. The frequency domain activity data for each group can be displayed individually, for comparison.

Figure 6:
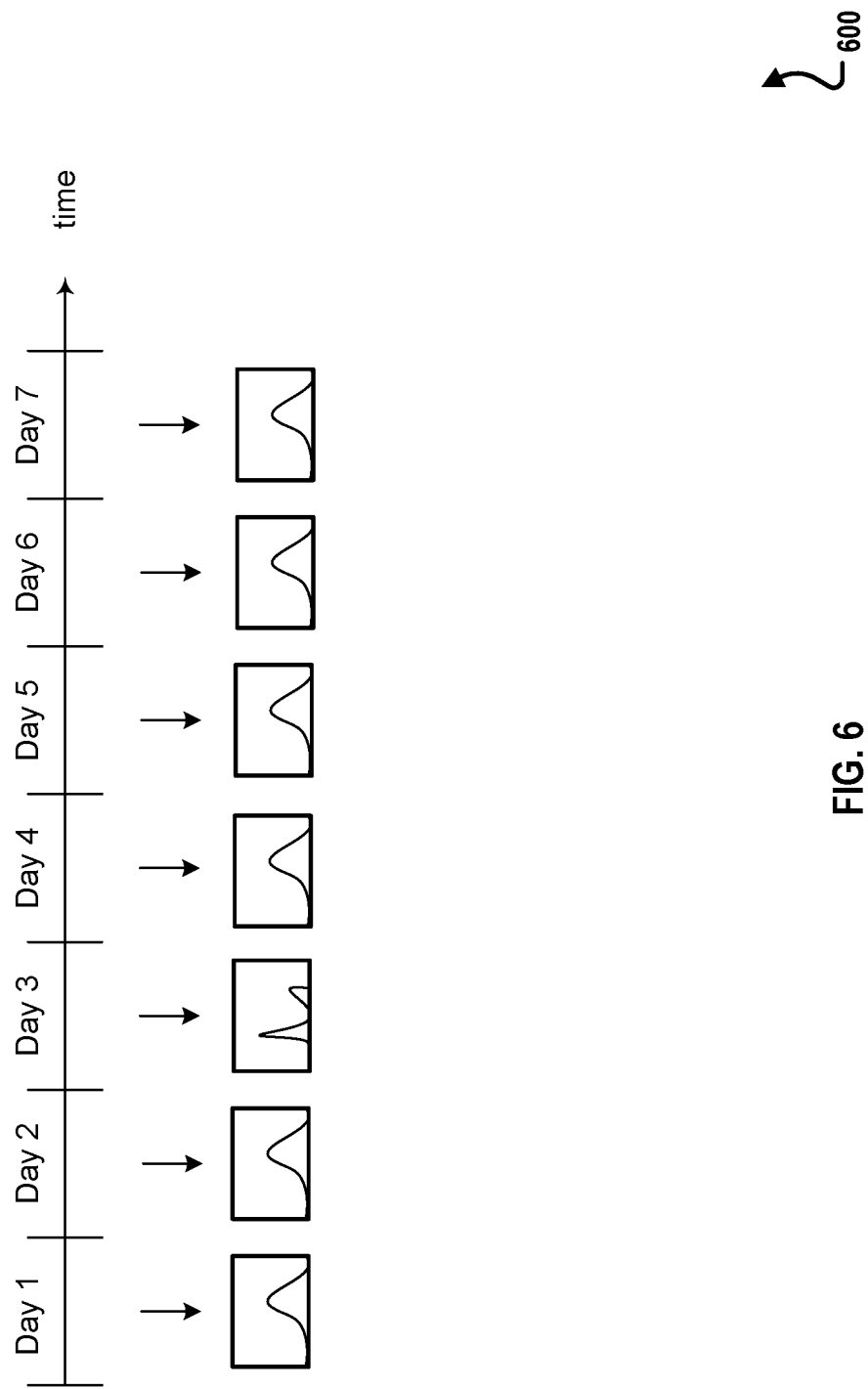
FIG. 6 is a schematic diagram illustrating a group of frequency activity data, according to an implementation.

FIG. 6 is a schematic diagram 600 illustrating a group of frequency activity data, according to an implementation. In the illustrated example, time domain activity data for seven sequential days are collected. Frequency domain activity data for each day are computed and represented in a graph.

In some cases, the graphs for each group can be displayed consecutively one after another, for example, a slide show. In one implementation, the graphs can be displayed using an animated format. Examples of the animated format include any versions of Graphics Interchange Format (GIF), Moving Picture Experts Group (MPEG), QUICKTIME, WINDOW MEDIA PLAYER, or any other video formats. Displaying the frequency activity data consecutively in a graphic user interface can make it easier for a system administrator that monitors the computer system to detect changes of the activity patterns in different time periods. For example, if there are no significant changes over time, the graphic user interface will resemble close to a still picture. But if there are significant changes over time, the graphic user interface will show a movement.

In some cases, the amplitudes of the frequency domain activity data, for example, the intensity in FIGS. 5A-5D, in each group are determined. Among these amplitudes, a maximum amplitude is determined. The maximum amplitude can be indicated using a user interface object, for example, a bar, an arrow, or the like. During the displaying of the consecutive graphs, the user interface object can indicate in which group the maximum amplitude is reached. As discussed previously, this approach may help to identity a change of periodicity.

Figure 7:
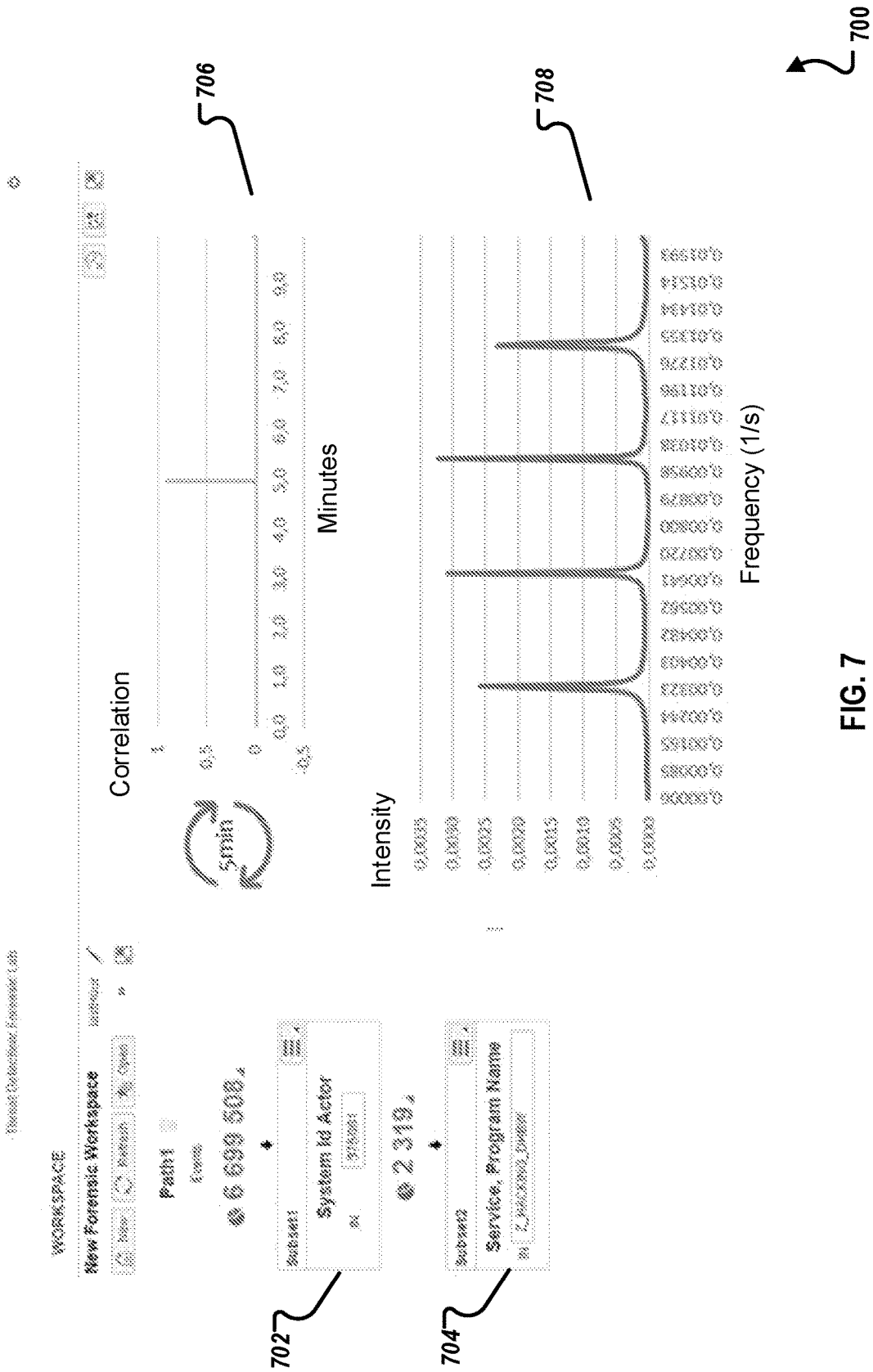
FIG. 7 is a screenshot illustrating a user interface for frequency analysis of activity data, according to an implementation.

FIG. 7 is a screenshot illustrating a user interface 700 for frequency analysis of activity data, according to an implementation. In the illustrated example, the activity data are filtered based on events associated with a particular user, as indicated in a first dialogue box 702, and associated with a particular program of the computer system, as indicated in second dialogue box 704. A graph 706 shows authorized jobs that are configured to execute periodically. As illustrated, an authorized job is configured to execute every 5 minutes. Graph 708 shows frequency domain activity data. As shown, the frequency domain activity data include peaks at multiple of $3.33 \times 10^{-3}$ Hz, which corresponds to the 5-minute periodicity of the scheduled job.

Returning to FIG. 1, from 106, process 100 proceeds to 108, where root cause analysis is performed. In some cases, the frequency domain activity data can be compared to determine whether a change of activities has taken place. For example, as discussed previously, amplitudes among different groups of frequency domain activity data can be compared to determine a maximum amplitude. The maximum amplitude can indicate a presence of a malicious job. Information regarding the job or multiple jobs that are associated with the maximum amplitude can be displayed for further analysis. For example, a link can be displayed with the maximum amplitude. The link can be selected, and information regarding the jobs that are executed at the frequency corresponding to the maximum amplitude can be displayed. The information can include, for example, whether the periodicity of the job has been changed, whether the job is executed in the background, whether the job is interrupted by user activities, or any other information that can be used to analyze whether the job is authorized.

Figure 8:
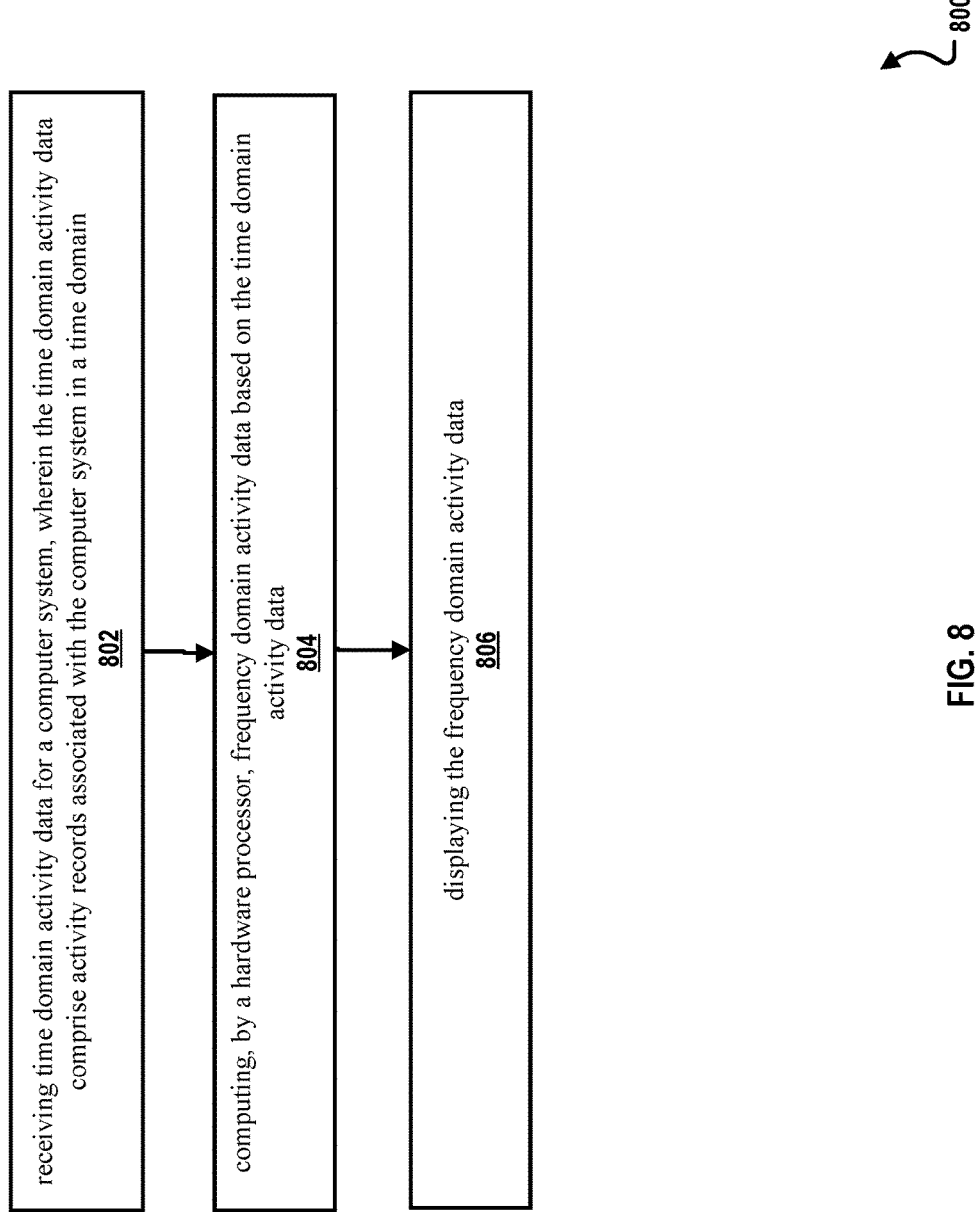
FIG. 8 is a flowchart illustrating an example method for a frequency analysis of activity data for a computer system, according to an implementation.

FIG. 8 is a flowchart illustrating an example method 800 for a frequency analysis of activity data for a computer system, according to an implementation. For clarity of presentation, the description that follows generally describes method 800 in the context of the other figures in this description. However, it will be understood that method 800 may be performed, for example, by any suitable system, environment, software, and hardware, or a combination of systems, environments, software, and hardware, as appropriate. In some implementations, various steps of method 800 can be run in parallel, in combination, in loops, or in any order.

At 802, time domain activity data for a computer system is received. The time domain activity data include activity records associated with the computer system in a time domain. In some cases, the activity records indicate the time at which jobs are executed on the computer system. From 802, method 800 proceeds to 804.

At 804, frequency domain activity data are computed based on the time domain activity data. In some cases, the frequency domain activity data are computed using Fourier Transform. In some cases, the time domain activity data are grouped into a plurality of groups. Each of the plurality of groups comprises time domain activity data in a time period. For each of the groups, frequency domain activity data are computed based on the time domain activity data in the respective group. From 804, method 800 proceeds to 806.

At 806, the frequency domain activity data are displayed. In some cases, the frequency domain activity data for each group are displayed consecutively. In some cases, the frequency domain activity data for each group are displayed using an animated format. In some cases, a maximum amplitude of the frequency domain activity data is determined. A user interface object indicating the maximum amplitude is displayed.

Figure 9:
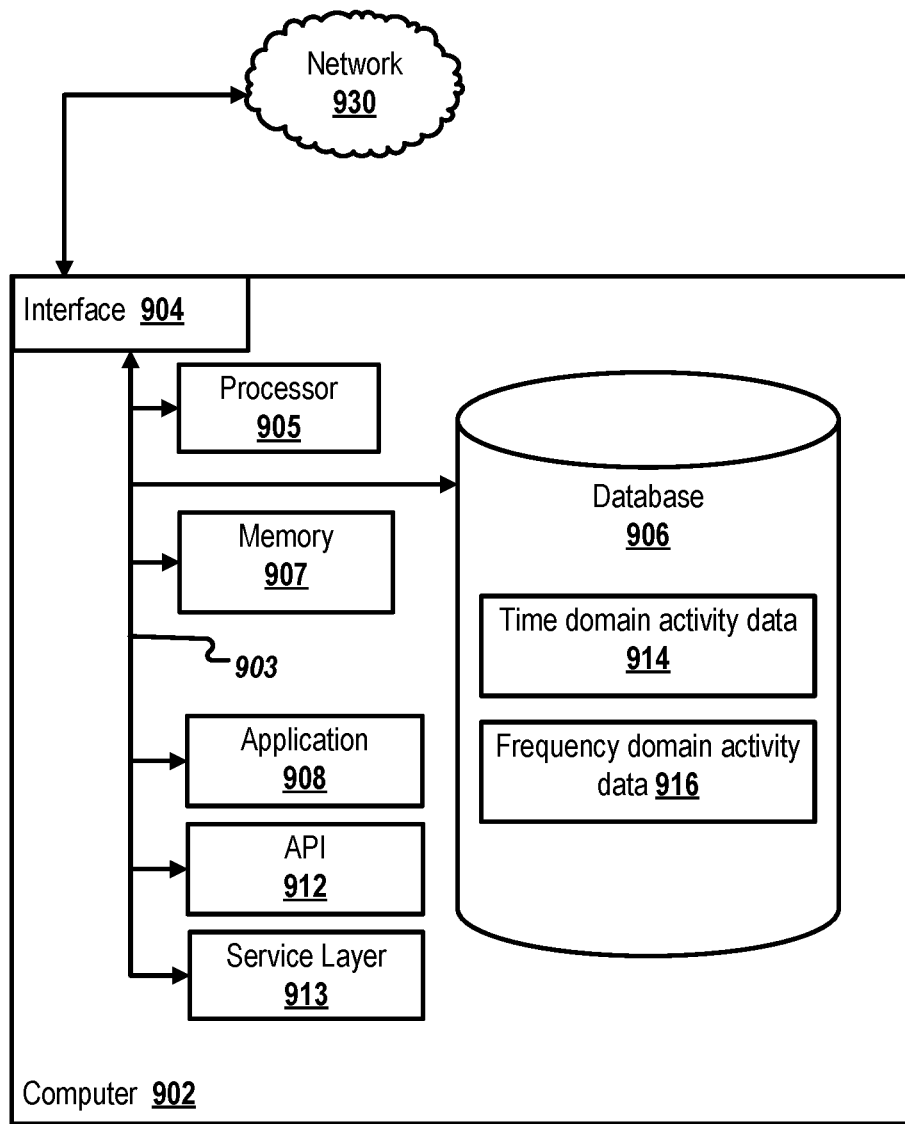
FIG. 9 is a block diagram illustrating an example computer system used to provide computational functionalities associated with described algorithms, methods, functions, processes, flows, and procedures, as described in the instant disclosure, according to an implementation.

FIG. 9 is a block diagram of an example computer system 900, used to provide computational functionalities associated with described algorithms, methods, functions, processes, flows, and procedures as described in the instant disclosure, according to an implementation. For example, the computer system 900 can be used to implement the intrusion detection system described herein. The computer system 900 can receive time domain activity data for a different computer system, wherein the time domain activity data comprise activity records associated with the different computer system in a time domain. The computer system 900 can compute frequency domain activity data based on the time domain activity data. The computer system 900 can display the frequency domain activity data.

The illustrated computer 902 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 902 may comprise a computer that includes an input device, such as a keypad, keyboard, touch screen, or other device that can accept user information, and an output device that conveys information associated with the operation of the computer 902, including digital data, visual, or audio information (or a combination of information), or a graphical user interface (GUI). The computer 902 can serve in a role as a client, network component, a server, a database or other persistency, or any other component (or a combination of roles) of a computer system for performing the subject matter described in the instant disclosure. The illustrated computer 902 is communicably coupled with a network 930. In some implementations, one or more components of the computer 902 may be configured to operate within environments, including cloud-computing-based, local, global, or other environment (or a combination of environments).

At a high level, the computer 902 is an electronic computing device operable to receive, transmit, process, store, or manage data and information associated with the described subject matter. According to some implementations, the computer 902 may also include, or be communicably coupled with, an application server, e-mail server, web server, caching server, streaming data server, or other server (or a combination of servers).

The computer 902 can receive requests over network 930 from a client application (for example, executing on another computer 902) and respond to the received requests by processing said requests in an appropriate software application. In addition, requests may also be sent to the computer 902 from internal users (for example, from a command console or by another appropriate access method), external or third-parties, other automated applications, as well as any other appropriate entities, individuals, systems, or computers.

Each of the components of the computer 902 can communicate using a system bus 903. In some implementations, any or all of the components of the computer 902, both hardware or software (or a combination of hardware and software), may interface with each other or the interface 904 (or a combination of both), over the system bus 903, using an application programming interface (API) 912 or a service layer 913 (or a combination of the API 912 and service layer 913). The API 912 may include specifications for routines, data structures, and object classes. The API 912 may be either computer-language independent or dependent and refer to a complete interface, a single function, or even a set of APIs. The service layer 913 provides software services to the computer 902 or other components (whether or not illustrated) that are communicably coupled to the computer 902. The functionality of the computer 902 may be accessible for all service consumers using this service layer. Software services, such as those provided by the service layer 913, provide reusable, defined functionalities through a defined interface. For example, the interface may be software written in JAVA, C++, or other suitable language providing data in extensible markup language (XML) format or other suitable format. While illustrated as an integrated component of the computer 902, alternative implementations may illustrate the API 912 or the service layer 913 as stand-alone components in relation to other components of the computer 902, or other components (whether or not illustrated) that are communicably coupled to the computer 902. Moreover, any or all parts of the API 912 or the service layer 913 may be implemented as child or sub-modules of another software module, enterprise application, or hardware module, without departing from the scope of this disclosure.

The computer 902 includes an interface 904. Although illustrated as a single interface 904 in FIG. 9, two or more interfaces 904 may be used according to particular needs, desires, or particular implementations of the computer 902. The interface 904 is used by the computer 902 for communicating with other systems in a distributed environment, that are connected to the network 930 (whether illustrated or not). Generally, the interface 904 comprises logic encoded in software or hardware (or a combination of software and hardware) and operable to communicate with the network 930. More specifically, the interface 904 may comprise software supporting one or more communication protocols associated with communications such that the network 930 or interface's hardware is operable to communicate physical signals within and outside of the illustrated computer 902.

The computer 902 includes a processor 905. Although illustrated as a single processor 905 in FIG. 9, two or more processors may be used according to particular needs, desires, or particular implementations of the computer 902. Generally, the processor 905 executes instructions and manipulates data to perform the operations of the computer 902 and any algorithms, methods, functions, processes, flows, and procedures, as described in the instant disclosure.

The computer 902 also includes a database 906 that can hold data for the computer 902 or other components (or a combination of both) that can be connected to the network 930 (whether illustrated or not). For example, database 906 can be an in-memory, conventional, or other type of database storing data consistent with this disclosure. In some implementations, database 906 can be a combination of two or more different database types (for example, a hybrid in-memory and conventional database) according to particular needs, desires, or particular implementations of the computer 902 and the described functionality. Although illustrated as a single database 906 in FIG. 9, two or more databases (of the same or combination of types) can be used according to particular needs, desires, or particular implementations of the computer 902 and the described functionality. While database 906 is illustrated as an integral component of the computer 902, in alternative implementations, database 906 can be external to the computer 902. As illustrated, the database 906 can hold time domain activity data 914 and frequency domain activity data 916.

The computer 902 also includes a memory 907 that can hold data for the computer 902 or other components (or a combination of both) that can be connected to the network 930 (whether illustrated or not). For example, memory 907 can be random access memory (RAM), read-only memory (ROM), optical, magnetic, and the like storing data consistent with this disclosure. In some implementations, memory 907 can be a combination of two or more different types of memory (for example, a combination of RAM and magnetic storage) according to particular needs, desires, or particular implementations of the computer 902 and the described functionality. Although illustrated as a single memory 907 in FIG. 9, two or more memories 907 (of the same or combination of types) can be used according to particular needs, desires, or particular implementations of the computer 902 and the described functionality. While memory 907 is illustrated as an integral component of the computer 902, in alternative implementations, memory 907 can be external to the computer 902.

The application 908 is an algorithmic software engine providing functionality according to particular needs, desires, or particular implementations of the computer 902, particularly with respect to functionality described in this disclosure. For example, application 908 can serve as one or more components, modules, applications, etc. Further, although illustrated as a single application 908, the application 908 may be implemented as multiple applications 908 on the computer 902. In addition, although illustrated as integral to the computer 902, in alternative implementations, the application 908 can be external to the computer 902.

There may be any number of computers 902 associated with, or external to, a computer system containing computer 902, each computer 902 communicating over network 930. Further, the term "client," "user," and other appropriate terminology may be used interchangeably, as appropriate, without departing from the scope of this disclosure. Moreover, this disclosure contemplates that many users may use one computer 902, or that one user may use multiple computers 902.

Described implementations of the subject matter can include one or more features, alone or in combination. One computer-implemented method includes receiving time domain activity data for a computer system, wherein the time domain activity data comprise activity records associated with the computer system in a time domain; computing, by a hardware processor, frequency domain activity data based on the time domain activity data; and displaying the frequency domain activity data.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other described implementations can each optionally include one or more of the following features, alone or in combination:

A first aspect, combinable with the general implementation, wherein the frequency domain activity data are computed using Fourier Transform.

A second aspect, combinable with the general implementation, wherein computing, by the hardware processor, frequency domain activity data based on the time domain activity data comprise: grouping the time domain activity data into a plurality of groups, each of the plurality of groups comprises time domain activity data in a time period; and for each of the groups, computing frequency domain activity data based on the time domain activity data in the respective group.

A third aspect, combinable with the general implementation, wherein the frequency domain activity data for each group are displayed consecutively.

A fourth aspect, combinable with the general implementation, wherein the frequency domain activity data for each group are displayed using an animated format.

A fifth aspect, combinable with the general implementation, further comprising: determining a maximum amplitudes of the frequency domain activity data; and displaying a user interface object indicating the maximum amplitude.

A sixth aspect, combinable with the general implementation, wherein the activity records indicate time at which jobs are executed on the computer system.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:
1. A computer-implemented method, comprising:
  receiving time domain activity data for a computer system, wherein the time domain activity data comprise activity records associated with the computer system in a time domain;
  filtering the time domain activity data based on activities associated with a monitored job or a monitored user;
  computing, by a hardware processor at an intrusion detection system, frequency domain activity data based on the filtered time domain activity data, wherein computing, by the hardware processor, the frequency domain activity data based on the filtered time domain activity data comprise:

grouping the filtered time domain activity data into a plurality of groups, each of the plurality of groups comprises filtered time domain activity data in a different time period; and for each of the groups, computing frequency domain activity data based on the filtered time domain activity data in the respective group;

identifying, by the hardware processor at the intrusion detection system, a presence of a malicious attack among the activity records by comparing the frequency domain activity data; and displaying, at the intrusion detection system, the frequency domain activity data for each group consecutively.

2. The computer-implemented method of claim 1, wherein the frequency domain activity data are computed using Fourier Transform.

3. The computer-implemented method of claim 1, wherein the frequency domain activity data for each group are displayed using an animated format.

4. The computer-implemented method of claim 1, further comprising:

determining a maximum amplitudes of the frequency domain activity data; and displaying a user interface object indicating the maximum amplitude.

5. The computer-implemented method of claim 1, wherein the activity records indicate time at which jobs are executed on the computer system.

6. A computer-implemented system, comprising:

a computer memory; and a hardware processor interoperably coupled with the computer memory and configured to perform operations comprising:

receiving time domain activity data for a computer system, wherein the time domain activity data comprise activity records for the different computer system in a time domain;

filtering the time domain activity data on activities associated with a monitored job or a monitored user;

computing frequency domain activity data based on the filtered time domain activity data, wherein computing the frequency domain activity data based on the filtered time domain activity data comprise:

grouping the filtered time domain activity data into a plurality of groups, each of the plurality of groups comprises filtered time domain activity data in a different time period; and for each of the groups, computing frequency domain activity data based on the filtered time domain activity data in the respective group;

identifying a presence of a malicious attack among the activity records by comparing the frequency domain activity data computed; and displaying the frequency domain activity data for each group consecutively.

7. The computer-implemented system of claim 6, wherein the frequency domain activity data are computed using Fourier Transform.

8. The computer-implemented system of claim 6, wherein the frequency domain activity data for each group are displayed using an animated format.

9. The computer-implemented system of claim 6, the operations further comprising:

determining a maximum amplitudes of the frequency domain activity data; and displaying a user interface object indicating the maximum amplitude.

10. The computer-implemented system of claim 6, wherein the activity records indicate time at which jobs are executed on the computer system.

11. A non-transitory, computer-readable medium storing one or more instructions executable by a computer system to perform operations comprising:

receiving time domain activity data for a computer system, wherein the time domain activity data comprise activity records for the different computer system in a time domain;

filtering the time domain activity data based on activities associated with a monitored job or a monitored user;

computing, by a hardware processor at the computer system, frequency domain activity data based on the filtered time domain activity data, wherein computing, by the hardware processor at the computer system, the frequency domain activity data based on the filtered time domain activity data comprise:

grouping the filtered time domain activity data into a plurality of groups, each of the plurality of groups comprises filtered time domain activity data in a different time period; and for each of the groups, computing frequency domain activity data based on the filtered time domain activity data in the respective group;

identifying, by the hardware processor at the computer system, a presence of a malicious attack among the activity records by comparing the frequency domain activity data; and displaying, at the computer system, the frequency domain activity data for each group consecutively.

12. The non-transitory, computer-readable medium of claim 11, wherein the frequency domain activity data are computed using Fourier Transform.

13. The non-transitory, computer-readable medium of claim 11, wherein the frequency domain activity data for each group are displayed using an animated format.

14. The non-transitory, computer-readable medium of claim 11, the operations further comprising:

determining a maximum amplitudes of the frequency domain activity data; and displaying a user interface object indicating the maximum amplitude.

* * * * *